United States Patent
Appleby et al.

(10) Patent No.: US 8,240,331 B2
(45) Date of Patent: Aug. 14, 2012

(54) NEGATIVE PRESSURE RELIEF VALVE ASSEMBLY

(75) Inventors: Andrew Appleby, Phoenix, AZ (US); Jennifer Reich, Chandler, AZ (US); Christopher Thomas, Tucson, AZ (US); Dave Tornquist, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 972 days.

(21) Appl. No.: 12/253,080

(22) Filed: Oct. 16, 2008

(65) Prior Publication Data

US 2010/0096035 A1    Apr. 22, 2010

(51) Int. Cl.
*F16K 15/03* (2006.01)
(52) U.S. Cl. .............. 137/527; 137/526; 137/899.2; 251/337
(58) Field of Classification Search ............. 137/526, 137/527, 527.2, 527.6, 899.2; 251/337
See application file for complete search history.

(56) References Cited

U.S. PATENT DOCUMENTS

| 190,357 | A | * | 5/1877 | Palmer | 137/527.8 |
|---|---|---|---|---|---|
| 1,871,536 | A | * | 8/1932 | Le Bus | 137/515 |
| 2,176,522 | A | * | 10/1939 | Brown | 137/527.6 |
| 2,224,494 | A | * | 12/1940 | White | 137/527 |
| 2,335,474 | A | | 11/1943 | Beall | |
| 2,399,326 | A | | 4/1946 | Andre | |
| 2,641,986 | A | | 6/1953 | Arthur | |
| 2,811,090 | A | | 10/1957 | Davis | |
| 2,827,921 | A | * | 3/1958 | Sherman et al. | 137/527 |
| 3,990,471 | A | * | 11/1976 | Schutzer et al. | 137/527 |
| 3,995,328 | A | | 12/1976 | Carolan et al. | |
| 4,350,950 | A | | 9/1982 | Waldmann et al. | |
| 4,351,501 | A | | 9/1982 | Peash et al. | |
| 4,557,183 | A | * | 12/1985 | Kolt | 454/358 |
| 4,724,707 | A | | 2/1988 | Innerhofer | |
| 4,856,547 | A | * | 8/1989 | Solaroli | 137/73 |

(Continued)

FOREIGN PATENT DOCUMENTS

DE    2251510    4/1974

(Continued)

OTHER PUBLICATIONS

Photograph of installed negative pressure relief received from component vendor in 2008.

*Primary Examiner* — John Rivell
*Assistant Examiner* — Kevin Murphy
(74) *Attorney, Agent, or Firm* — Ingrassia Fisher & Lorenz, P.C.

(57) ABSTRACT

A negative pressure valve assembly is provided. The valve assembly comprises a valve port assembly comprising a port and a flange substantially surrounding the port, a valve comprising a plate adapted to substantially cover the port, the plate comprising a minor edge, a major edge having a major edge length, and a plate biasing assembly stop located at a first position along the major edge, the first position more than 50% of the major edge length as measured from the minor edge. The valve assembly further comprises a hinge coupled to the plate, the hinge adapted to couple the plate to the flange, and first plate biasing assembly adapted to couple to the valve port assembly and to bias the plate towards the valve port assembly, the first plate biasing assembly comprising a resilient member adapted to contact the stop plate.

19 Claims, 5 Drawing Sheets

U.S. PATENT DOCUMENTS

| | | | |
|---|---|---|---|
| 5,046,686 A * | 9/1991 | Carla et al. | 244/118.5 |
| 5,085,604 A | 2/1992 | Onoue et al. | |
| 5,099,686 A | 3/1992 | Kohler | |
| 5,107,888 A * | 4/1992 | Dunmire | 137/527 |
| 5,146,949 A * | 9/1992 | Retzloff et al. | 137/527 |
| 5,233,542 A | 8/1993 | Hohner et al. | |
| 5,520,578 A | 5/1996 | Bloch et al. | |
| 5,925,817 A | 7/1999 | Kidokoro et al. | |
| 6,038,932 A | 3/2000 | Wandel et al. | |
| 6,159,091 A | 12/2000 | Horstman et al. | |
| 6,273,136 B1 | 8/2001 | Steinert et al. | |
| 6,422,582 B1 | 7/2002 | Howard | |
| 6,588,285 B1 | 7/2003 | Vozhdaev et al. | |
| 6,676,504 B2 | 1/2004 | Petri et al. | |
| 6,746,322 B2 | 6/2004 | Scheerer et al. | |
| 6,813,942 B1 | 11/2004 | Vozhdaev et al. | |
| 6,945,278 B2 | 9/2005 | Bunn et al. | |
| 7,077,383 B1 | 7/2006 | Dreisilker et al. | |
| 7,325,569 B2 | 2/2008 | Denike et al. | |
| 2002/0173263 A1 | 11/2002 | Petri et al. | |
| 2002/0193063 A1 | 12/2002 | Scheerer et al. | |
| 2006/0019594 A1 | 1/2006 | Horner et al. | |
| 2007/0010188 A1 | 1/2007 | Horner et al. | |
| 2007/0049188 A1 | 3/2007 | McCoy | |
| 2007/0102576 A1 | 5/2007 | McCoy et al. | |

FOREIGN PATENT DOCUMENTS

| | | |
|---|---|---|
| DE | 2241872 | 5/1974 |
| DE | 2641795 | 3/1978 |
| DE | 3301547 | 7/1984 |
| DE | 3618798 | 12/1987 |
| DE | 202007015623 | 2/2008 |
| EP | 0898368 | 2/1999 |
| EP | 1660370 | 5/2006 |
| GB | 694235 | 7/1953 |
| GB | 694299 | 7/1953 |
| GB | 696755 | 9/1953 |
| GB | 816515 | 7/1959 |
| GB | 2037995 | 7/1980 |
| GB | 1583490 | 1/1981 |
| WO | 8404590 | 11/1984 |
| WO | 8903975 | 5/1989 |
| WO | 0236976 | 5/2002 |
| WO | 03081194 | 10/2003 |

* cited by examiner

NEGATIVE PRESSURE RELIEF VALVE ASSEMBLY

TECHNICAL FIELD

Embodiments of the subject matter described herein relate generally to fluid valves. More particularly, embodiments of the subject matter relate to pressure relief valves.

BACKGROUND

Aircraft typically travel to altitudes where the ambient environment contains insufficient oxygen for normal respiration. For this reason, they are usually constructed to be airtight during operation. Thus, when in flight at high altitudes, they can be internally pressurized, resulting in a more comfortable environment for the operators and passengers. Aircraft are typically constructed to withstand such pressurization, where the internal pressure exceeds the external pressure.

Internal pressurization is typically controlled and managed by the operator of the aircraft. During flight, the air pressure within the pressurized aircraft is greater than the external pressure at normal travelling altitudes. Thus, concern over maintaining integrity of the aircraft typically centers on retaining air within the aircraft.

Under certain circumstances, however, the air pressure within the aircraft can be less than that of the surrounding environment. As one example, the internal space of an aircraft can have a higher air pressure than the ambient pressure during flight, but that higher pressure environment can be less than the ambient pressure at a planned landing site.

Increased external pressure is typically mitigated through the use of a negative pressure relief valve. Such a relief valve can be constructed to permit fluid, such as air, from the external environment to enter the aircraft when the pressure differential exceeds a certain amount. Such valves, however, can be exposed to harsh conditions, including the ambient environment, weather, stress fatigue, and so on. When a negative pressure relief valve is compromised, it can substantially affect the normal operating performance, which in turn affects the pressure differential experienced by the aircraft. Therefore, it is desirable to have a negative pressure relief valve that maintains significant operating capability regardless of its physical and structural integrity.

BRIEF SUMMARY

A negative pressure valve assembly is provided. The negative pressure valve assembly comprises a valve port assembly, a valve, a hinge coupled to the plate along a minor edge, and a first plate biasing assembly. The valve port assembly comprises a port and a flange substantially surrounding the port. The valve comprises a plate adapted to substantially cover the port and extending at least partially over the flange. The plate comprises a minor edge, a major edge having a major edge length, and a plate biasing assembly stop located at a first position along the major edge, the first position more than 50% of the major edge length, as measured from the minor edge, the plate biasing assembly stop extending away from the major edge and comprising a stop plate. The hinge is adapted to couple the plate to the flange. The first plate biasing assembly is coupled to the plate at the plate biasing assembly stop and adapted to couple to the valve port assembly and to bias the plate towards the valve port assembly. The first plate biasing assembly comprises a resilient member adapted to contact the stop plate.

A pressure relief valve is also provided. The pressure relief valve comprises a plate having a major surface area and a first edge, the plate extending along a longitudinal axis, a hinge coupled to the plate along the first edge, the hinge adapted to couple to a port assembly, and a first positioning spring assembly coupled to the plate at a first position, wherein at least 50% of the major surface area of the plate is disposed between the first position and the first edge, as measured along the longitudinal axis, and the first positioning spring assembly is adapted to couple to the port assembly and to bias the plate towards the port assembly. The first positioning spring assembly comprises a compression spring having a first end, a coupling rod extending along the compression spring, and a spring stop adapted to receive the first end of the compression spring.

A pressure relief valve assembly is also provided. The pressure relief valve assembly comprises a planar member extending along a longitudinal axis, the planar member comprising a major surface area, a first edge, and a first biasing assembly stop at a first position, wherein at least 50% of the major surface area of the planar member is disposed between the first position and the first edge, as measured along the longitudinal axis, the first biasing assembly stop extending in a transverse direction to the longitudinal axis, a hinge coupled to the planar member along the first edge, the hinge adapted to couple to a port assembly, and a first biasing assembly comprising a first resilient member, the first resilient member coupled to the first biasing assembly stop, and the first biasing assembly adapted to couple to the port assembly and continually bias the planar member towards the port assembly during rotation of the planar member about the hinge.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
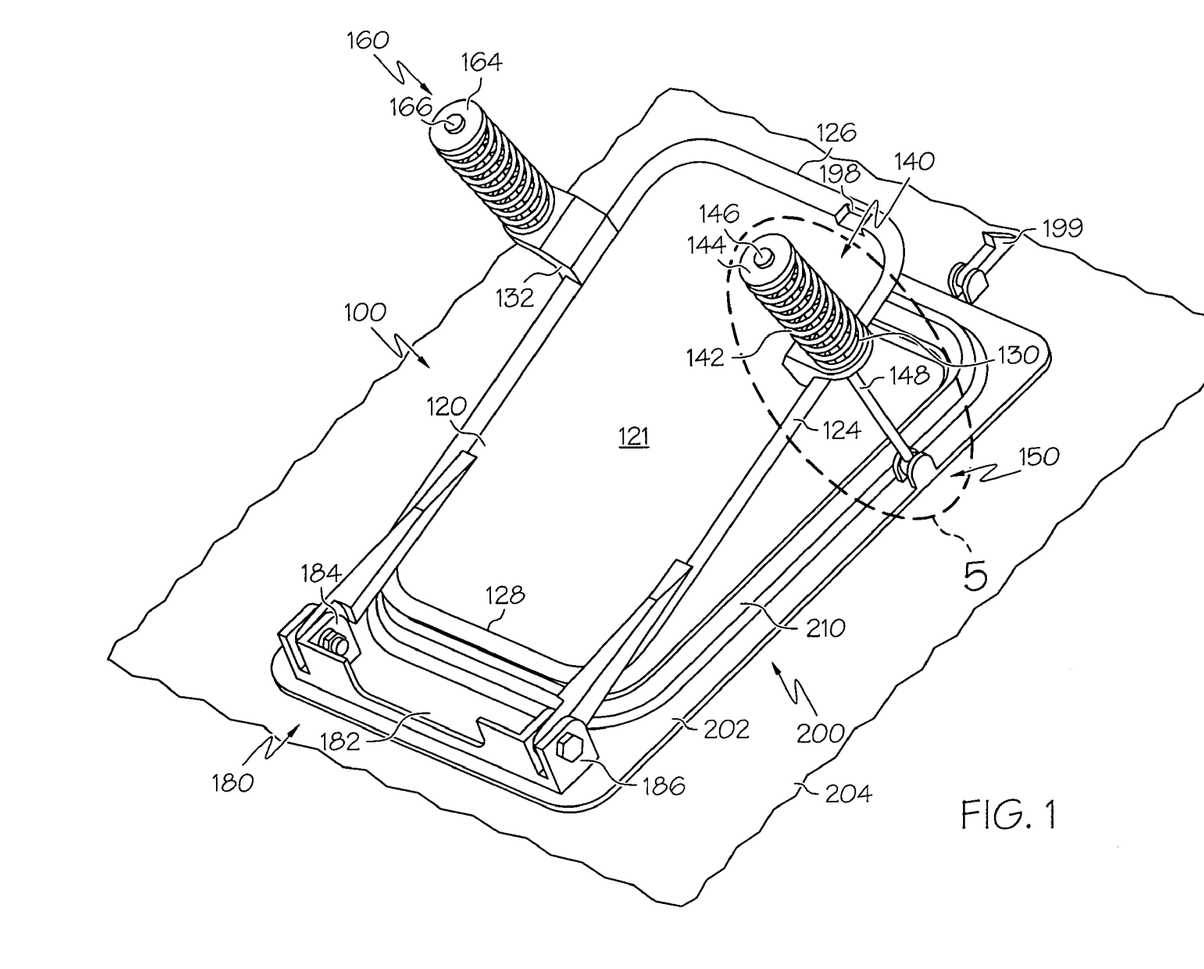
FIG. 1 is a perspective view of an embodiment of a negative pressure relief valve in a first position.

"Coupled"—The following description refers to elements or features being "coupled" together. As used herein, unless expressly stated otherwise, "coupled" means that one element/node/feature is directly or indirectly joined to, or arranged so as to exert mutual influence between another element/node/feature, and not necessarily mechanically. Thus, although the schematic shown in FIG. 1 depicts one exemplary arrangement of elements, additional intervening elements, devices, features, or components may be present in an embodiment of the depicted subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard," and "inboard" describe the orientation and/or location of portions of the component within a consistent but arbitrary frame of reference which is made clear by reference to the text and the associated drawings describing the component under discussion. Similarly, the terms "first", "second" and other such numerical terms referring to structures do not imply a sequence or order unless clearly indicated by the context.

Figure 2:
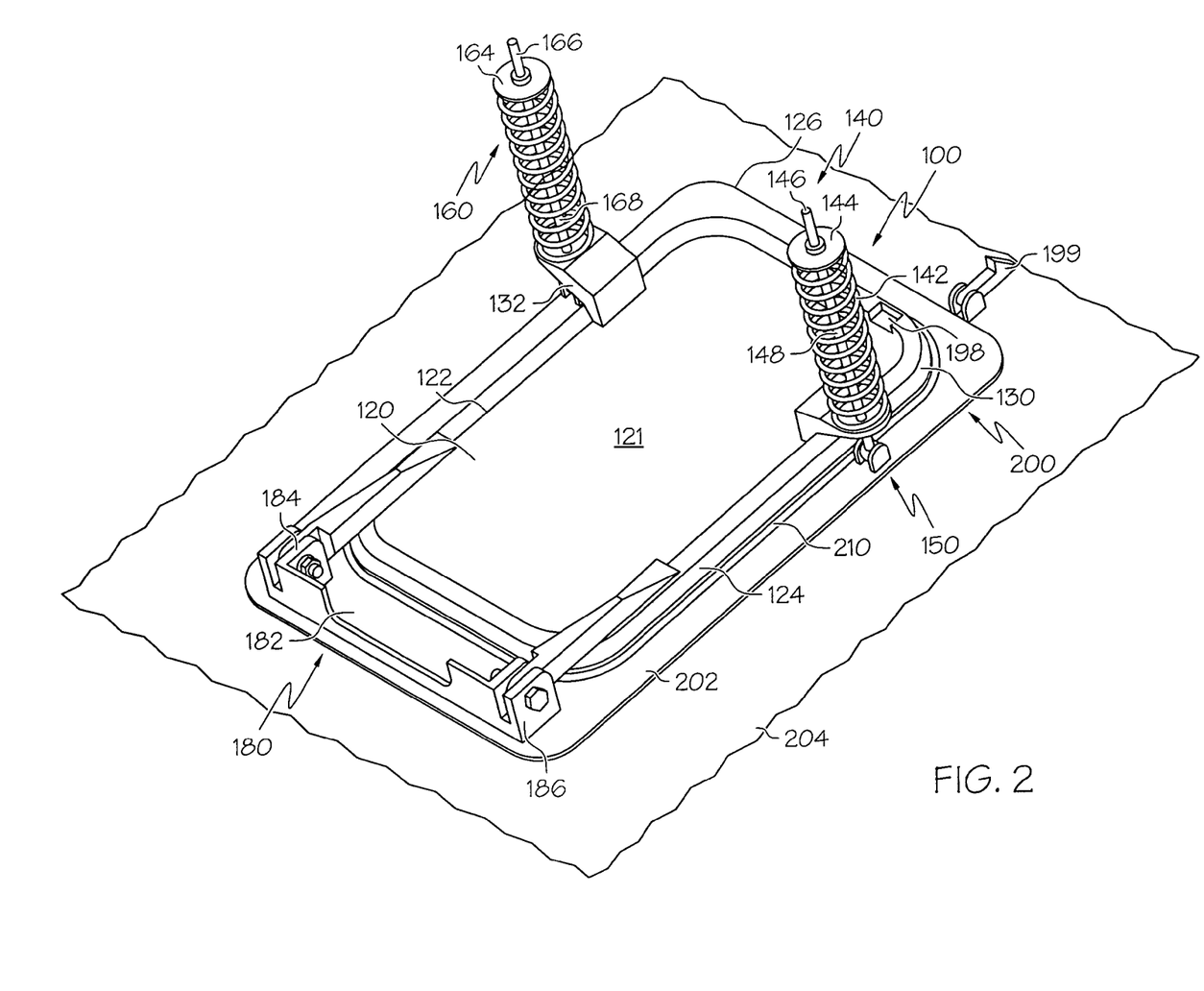
FIG. 2 is a perspective view of the negative pressure relief valve of FIG. 1 in a second position.
Figure 3:
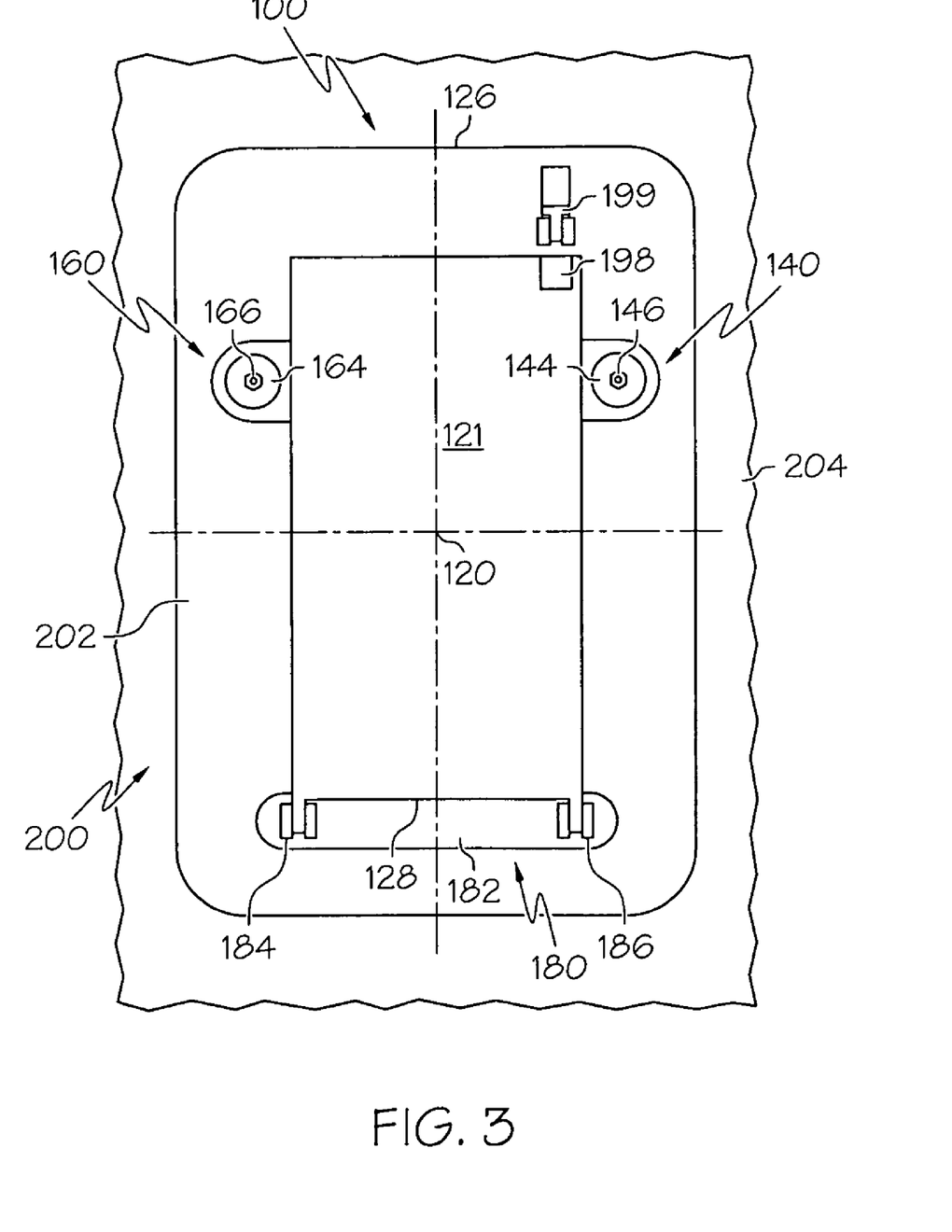
FIG. 3 is a top view of the negative pressure relief valve of FIG. 2.
Figure 4:
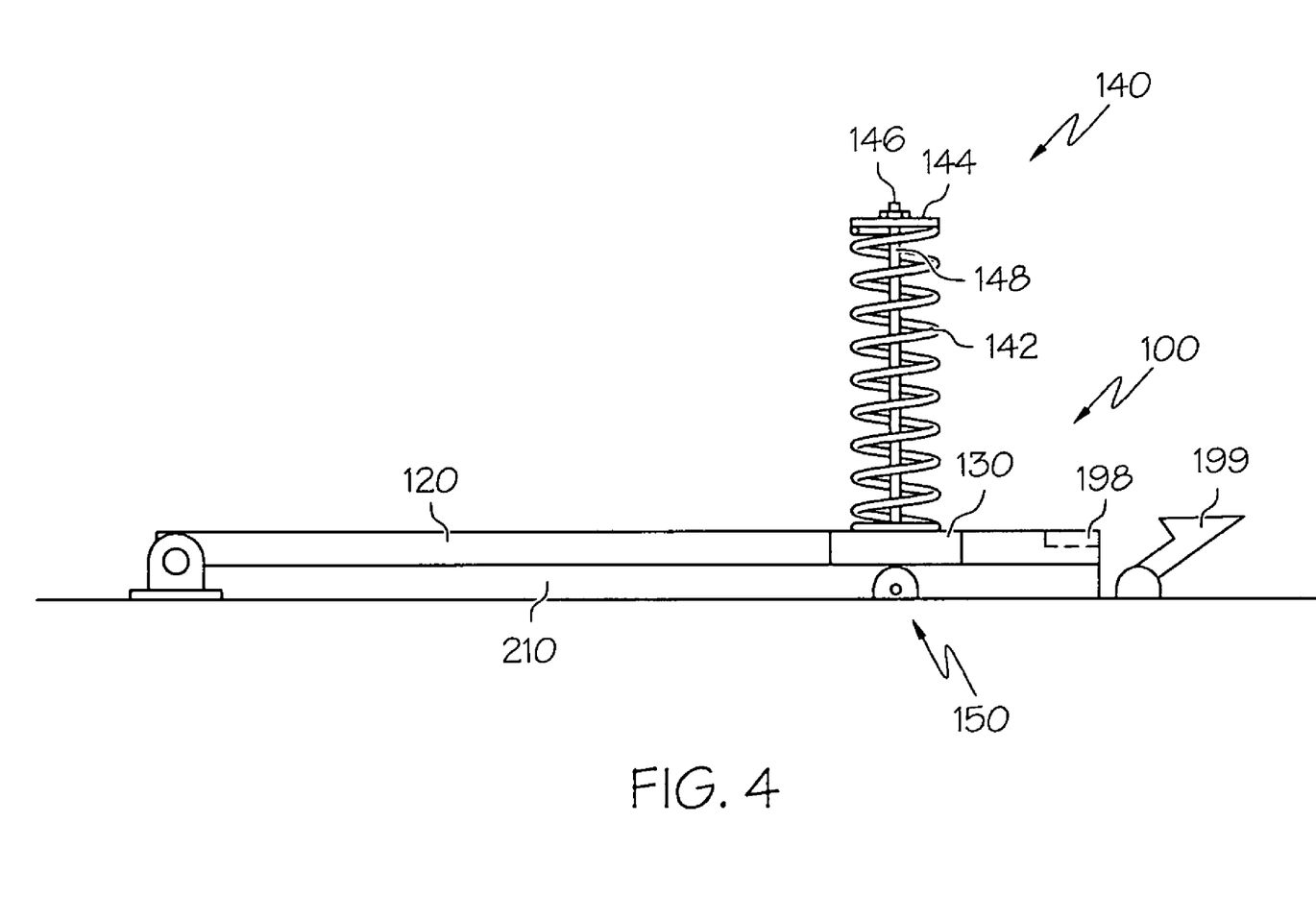
FIG. 4 is a side view of the negative pressure relief valve of FIG. 3.
Figure 5:
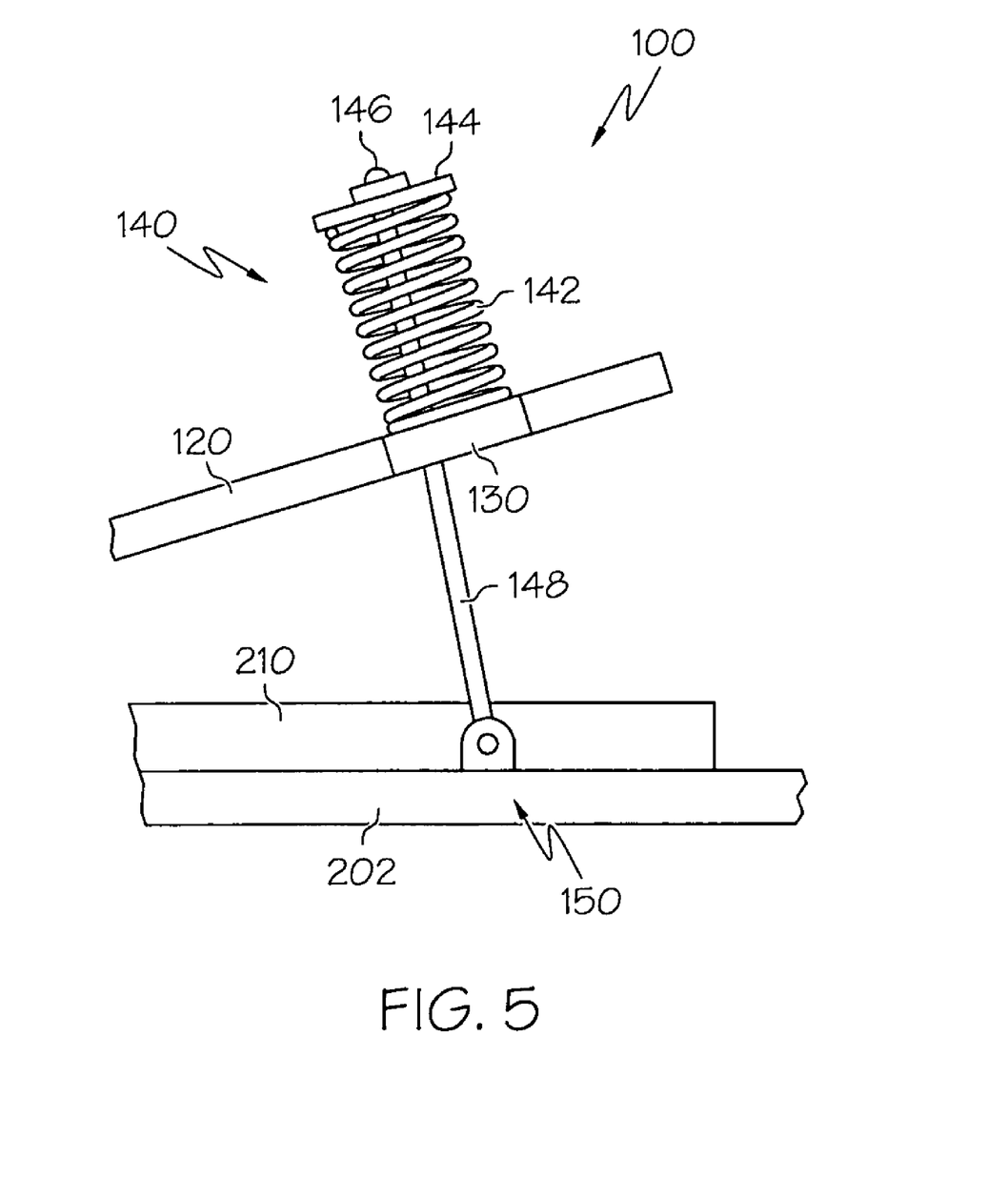
FIG. 5 is detailed view of a positioning spring assembly of the negative pressure relief valve of FIG. 1.

FIGS. 1-4 illustrate an embodiment of a negative pressure relief valve assembly 100, which can be adjacent a port assembly 200. FIG. 1 illustrates the valve assembly 100 in a first, open position. FIG. 2 illustrates the valve assembly 100 in a second, closed position. FIG. 3 illustrates a top view of the valve assembly 100 in the second, closed position. FIG. 4 illustrates a side view of the valve assembly 100 in the second, closed position. FIG. 5 illustrates a detail view of a biasing assembly utilized by the valve assembly 100. FIG. 5 corresponds to the valve assembly 100 in the first, open position shown in FIG. 1.

As shown, a negative pressure relief valve assembly 100 is coupled to a port assembly 200. The valve assembly 100 can comprise a planar member 120, a first biasing assembly 140, a second biasing assembly 160, and a hinge assembly 180. The port assembly 200 can comprise a port 220 surrounded by a flange 202. The port assembly 200 can further comprise a collar or raised portion 210 appropriately sized and shaped to cooperate with the planar member 120 to cover and/or seal the port 220. The valve assembly 100 can be installed with only compression members, such as springs in the biasing assemblies 140, 160. Compression members are simpler to install than some other types of biasing devices, such as torsional springs. Accordingly, the valve assembly 100 can be advantageously easy and straightforward to install because, for example, it can avoid the use of specialized installation tools. Additionally, the placement of multiple biasing devices can permit the valve assembly 100 to operate in the event of damage or defect to certain components.

The valve assembly 100 preferably is coupled to the port assembly 200 at a location of fluid communication between an interior environment and ambient environment. For example, in the illustrated embodiment, the port assembly 200 is disposed in a fuselage 204 of an aircraft. Other vehicles, buildings, and apparatuses can also be the site of the port assembly 200. For example, a pressurized system, such as a fluidic power-generating system can also comprise such a valve assembly. As another example, a clean room environment can comprise a valve assembly embodying at least some features and techniques described herein.

The valve assembly 100 can comprise a planar member 120 appropriately sized and shaped to cover and/or seal the port 220. The planar member 120 is preferably of a regular geometric shape, such as the illustrated quadrilateral. Other regular geometric shapes, including triangular, pentagonal, hexagonal, and so on, can also be used, as well as irregular shapes appropriate to the geometry of the port 220 and port assembly 200. In certain embodiments, the planar member 120 can extend beyond the raised portion 210 and/or port 220 to further cover or seal the port assembly 200. The planar member 120 can comprise a plate of a metal, including aluminum, titanium, or steel, or an alloy thereof, a ceramic or composite material, or any other suitable material. The planar member 120 can have multiple layers and/or a surface finish, if desired. Additionally, though described a planar, or resembly a plane, the planar member 120 can additionally be embodied with out-of-plane elements and features. In certain embodiments, the sealing device described as the planar member 120 can bear no relation to a plane, and can instead be an object of sufficient size and shape to perform the function of the planar member 120, such as a rectangular prism or substantially irregularly-shaped object.

The planar member 120 has a major surface area 121 of a certain size, which can vary depending on the embodiment. The planar member 120 preferably extends along a longitudinal axis l and a transverse axis t. In the illustrated embodiment, the longitudinal axis l extends lengthwise down the long dimension of the planar member 120. The transverse axis t extends perpendicular to the longitudinal axis l, across the shorter dimension of the planar member 120. The planar member 120 can have at least one major edge 122, 124 associated with its long dimension and at least one minor edge 126, 128 associated with its short dimension. Other embodiments of different geometric shapes can have differently-located major and minor edges while still comprising longitudinal and transverse axes l, t. As shown in the illustrated embodiment, two major edges 122, 124 and two minor edges 126, 128 can be present in the same embodiment.

The area 121 of the surface of the planar member 120 can be measured as extending along either the longitudinal or transverse axes l, t. For example, in the illustrated embodiment, as measured along the longitudinal axis l and extending away from the hinge assembly 180, 0% of the area 121 of the planar member 120 is present at the first minor edge 128. At a position in the center of the planar member 120, 50% of the area 121 is situated between the center and the first minor edge 128. Finally, 100% of the area 121 of the planar member 120, as measured along the longitudinal axis l from the first minor edge 128, is disposed between the first minor edge 128 and the second minor edge 126.

As used herein, "along" describes a direction coinciding with a reference. For example, a component can be described as extending along a longitudinal axis. Reference objects, such as a longitudinal axis, are understood to extend in a fixed direction. When the component is described as extending along the reference object, it means that the component is positioned or disposed such that its predominant length extends in a manner parallel to, or in the same general direction as a longitudinal axis. The component need not extend through a location occupied by the axis or in a direction exactly parallel to the axis. In some usages, any direction short of directly transverse to the reference direction can be considered "along" the reference direction.

The planar member 120 can comprise first and second biasing assembly stops 130, 132. Each of the biasing assembly stops 130, 132 is preferably a flange or protrusion extending away from the respective edge of the planar member 120, either along the longitudinal or transverse axes l, t. The biasing assembly stops 130, 132 can comprise a flat portion and a hole. The flat portion is preferably along the same plane as the planar member 120, or nearly parallel thereto. The hole is preferably located near the center of the flat portion and appropriately sized to receive a portion of one of the first or second biasing assemblies 140, 160. In some embodiments, a connecting device, such as the coupling rods 148, 168 can extend through the hole.

Although two biasing assembly stops 130, 132 are shown as embodiments of stops for biasing members, more or fewer can be present and positioned as appropriate for the embodiment of the planar member 120. Preferably, the number of biasing assembly stops present is equal to the number of biasing assemblies in the embodiment. Additionally, while referred to as biasing assembly stops, the flanges or protrusions are preferably embodied to couple with the biasing assemblies 140, 160. Thus, in those embodiments of the biasing assemblies 140, 160 where a spring is used as a resilient, biasing member, spring stops are appropriate. Where elastomeric members are used, the biasing assembly stops 130, 132 can comprise other components and/or features or alternate embodiments of the flanges and/or protrusions. Preferably, such components are suitable to providing a stop for the elastomeric biasing assemblies to exert a force upon. Preferably, the coupling between the biasing assembly stops 130, 132 and biasing assemblies 140, 160 does not impede or inhibit rotation of the planar member 120 about the hinge assembly 180, except for the intended bias from the biasing assemblies 140, 160.

The biasing assembly stops 130, 132 are located at first and second positions of the planar member 120, respectively. As shown, each biasing assembly stop 130, 132 can be located along a major edge 122, 124 of the planar member 120. In other embodiments, one or more of the biasing assembly stops 130, 132 can be located along a minor edge. Preferably, at least one of the biasing assembly stops 130, 132 is located at a position along the longitudinal axis l, as measured from the first minor edge 128 comprising the hinge assembly 180, at which more than 50% of the area 121 of the planar member 120 is disposed between the position and the first minor edge 128. Each of the edges can have a length associated with them. Thus, the position of the biasing assembly stops 130, 132 can be described with reference to the edge length. In the illustrated embodiment, for example, 50% of the area 121 of the planar member 120 is disposed between the first minor edge 128 and 50% of the length of either of the major edges 122, 124, as measured along the longitudinal axis 1 of the planar member 120. In certain embodiments, including the illustrated embodiment, multiple or all of the biasing assembly stops can be so positioned.

Preferably, at least two stops are present in an embodiment. In embodiments with multiple stops, at least one stop is preferably disposed across the longitudinal axis l from another stop. Thus, with reference to the illustrated embodiment, the second biasing assembly stop 132 is located on the opposite major edge 122 from the first biasing assembly stop 130. Although the biasing assembly stops 130, 132 are shown approximately on a transverse axis extending substantially parallel to the minor edges 126, 128, in other embodiments, they can be differently spaced along the major edges 122, 124 as desired. Preferably, not all biasing assembly stops 130, 132 are located on the same edge of the planar member 120, although some embodiments, such as circular embodiments, can have such an arrangement.

In some embodiments, the planar member 120 can also comprise a latching point 198 or coupling point for a locking device 199. The latching point 198 is preferably disposed across the longitudinal and/or transverse axes l, t from the hinge assembly 180. A matching locking device 199, latch, or coupling device, as part of the port assembly 200, can be used to secure the valve assembly 100 to the port assembly 200, thereby inhibiting separation of the planar member 120 from the port assembly 200. Such a locking device 199 or latch can be used to secure the valve assembly 100 should an operator desire to inhibit fluid flow through the port 220 under any pressure differential.

The first and second biasing assemblies 140, 160 can be coupled to the valve assembly 100 and port assembly 200. Preferably, the biasing assemblies 140, 160 are coupled to the valve assembly 100 at the first and second biasing assembly stops 130, 132. The first biasing assembly 140 preferably comprises a first biasing member 142, a first biasing member stop 144, a first retention member 146, and a first coupling rod 148. Although the first biasing assembly 140 is described in detail, the second biasing assembly 160 is substantially similar, and the components can be identical, with the number indicating each incremented by 20 from the first biasing assembly 140.

The depicted biasing member 142 is a helical compression spring, though other resilient members can be used. Preferably, the resilient member is disposed between the first biasing member stop 144 and the first biasing assembly stop 130, as shown, exerting a continuous outward force on both. For descriptive purposes, the first biasing member 142 can be understood to have two ends, the first end contacting the first biasing member stop 144 and the second end contacting the first biasing assembly stop 130. Other resilient members besides a helical spring can be used, such as elastomeric members, however, as appropriate to the embodiment. Additionally, the helical compression spring can be composed of a metal or an elastomer, as desired.

The first biasing member stop 144 can be a washer, plate, or other thin device adapted to contact the first biasing member 142. In the illustrated embodiment, a disc-shaped washer is used, though the first biasing member stop 144 is preferably suitable to the specific biasing member used. The first biasing member stop 144 can also be appropriate to the biasing member. Thus, a spring stop can be present when a spring is used, and so on.

The first biasing member stop 144 can be coupled to the first coupling rod 148. The first coupling rod 148 preferably extends through the hole in the first biasing assembly stop 130 to couple with the first pivot assembly 150. Although a cylindrical rod is depicted, other coupling rods can have different geometries or be alternative devices, such as a chain or elastomeric member.

Preferably, the first coupling rod 148 couples the first biasing member stop 144 to the first pivot assembly 150. Thus, the first biasing member 142 is properly positioned to bias the planar member 120 toward the port assembly 200 by exerting an appropriately-directed force on the first biasing assembly stop 130. As the planar member 120 is pushed toward the first biasing member stop 144 by pressure from air or another fluid flowing through the port 220, it will rotate about the hinge assembly 180. As it rotates, the first biasing member 142 will compress between the first biasing assembly stop 130 and the first biasing member stop 144. Due to its resilient nature, the first biasing member 142 will exert an expanding force directed to bias the planar member 120 towards the port assembly 200, as described above.

The first retention member 146 is preferably coupled to the first biasing member stop 144 and/or the first coupling rod 148. Preferably, the first retention member 146 limits the movement of the first biasing member stop 144. Thus, although the first biasing member 142 can exert a force on the first biasing member stop 144 directed away from the port assembly 200, the first retention member 146 can inhibit its travel. As a result, the first biasing member stop 144 constrains the first biasing member 142, and causes force to be exerted on the first biasing assembly stop 130 by the first biasing member 142. The first retention member 146 can be a bolt threadedly engaged with the first coupling rod 148, as shown. In other embodiments, other mechanisms and/or techniques, such as lynch pins or welding can be used to inhibit outward movement of the first biasing member stop 144, relative to the port assembly 200.

The first coupling rod 148 can be rotatably or pivotally coupled to the port assembly 200 by a first pivot assembly 150. In certain embodiments, the first coupling rod 148 can be fixedly connected to the port assembly 200. Similarly, the second pivot assembly, which couples the second biasing assembly 160 to the port assembly 200, can also be rotatably, pivotally, or fixedly connected. The first pivot assembly 150 can be coupled to the flange 202, as shown, or directly to the fuselage 204, or other structure as appropriate to the embodiment. The first pivot assembly 150 preferably inhibits movement of the first coupling rod 148 away from or along the flange 202 and/or fuselage while permitting it to rotate or pivot. Thus, the first pivot assembly 150 can comprise a through pin or other coupling device or technique sufficient to accomplish its purpose. Although shown permitting rotation about a single axis through the use of a pin, the first pivot assembly 150 can also permit rotation and/or pivoting of the first coupling rod 148 about other axes, including rotation of the first coupling rod 148 along its long axis through the use of ball and socket joints and so on.

As the planar member 120 rotates about the hinge assembly 180, the first pivot assembly 150 permits the first coupling rod 148 to change its angle with respect to the flange 202, fuselage 204, or other coupling location. With reference to FIG. 4, as can be seen when the valve assembly 100 is in the closed position, the first coupling rod 148 can extend away from the flange 202 substantially perpendicularly. However, as can be seen in FIGS. 1 and 5, when the valve assembly 100 is in an open position, the first coupling rod 148 can rotate to a non-perpendicular angle with respect to the flange 202. The first pivot assembly 150 couples the first coupling rod 148 to the flange 202 during its rotation. Additionally, although the first pivot assembly 150 is visible, preferably all coupling rods of biasing assemblies, including the second biasing assembly 160, are coupled to the port assembly 200 by a pivot assembly. In those embodiments comprising additional biasing assemblies, additional pivot assemblies can be present.

The hinge assembly 180 can be located along a minor edge 128 of the planar member 120. Preferably, the hinge assembly 180 comprises a hinge plate 182, and first and second hinge pivot devices 184, 186. Additionally, in certain embodiments, the hinge pivot devices 184, 186 can comprise a hinge biasing member for the purpose of biasing the planar member 120 towards the port assembly 200. The hinge biasing member can be a spring, including a torsional spring, if desired. Other hinge biasing members can be resilient devices, such as elastomeric members. Also, other embodiments of the hinge assembly 180 can comprise different connection techniques between the planar member 120 and the hinge plate 182. More or fewer hinge pivot devices 184, 186 of varying size, length, and strength of bias can be used in different embodiments, as desired.

The hinge plate 182 can be coupled to the flange 202, as depicted, or to the fuselage 204 in certain embodiments. Preferably, the hinge plate 182 provides a stable and flat portion to which the valve assembly 100 can be coupled. Accordingly, the hinge plate 182 can be of any suitable material, shape, and/or size appropriate. Certain embodiments can omit the hinge plate 182 and couple the valve assembly 100 directly to the flange 202 and/or fuselage 204, or other surrounding structure when the valve assembly 100 is not disposed in an aircraft.

The port assembly 200, or valve port assembly, preferably comprises a port 220 surrounded by a flange 202. The port 220 permits fluid communication between the interior of the embodiment and the ambient atmosphere. The flange 202 preferably surrounds, completely or partially, the port 220. The materials comprising the flange 202 can be specific to the embodiment.

Near the port 220, the port assembly 200 can further comprise a raised portion 210 adapted to interface with the planar member 120 to seal the port 220. In certain embodiments, the raised portion 210 can be continuous with the flange 202. In other embodiments, the raised portion 210 can comprise a different material and/or be a separate component coupled to the flange 202. In certain embodiments, a sealing member, such as an o-ring, lip, liner, or other sealing device can be present along the contact site of the planar member 120 and the port assembly 200. Such a sealing member can further inhibit fluid from flowing past the planar member 120, through the port 220, when the valve assembly 100 is in the closed position, thereby enhancing the seal between the raised portion 210 and the planar member 120.

When in use, the valve assembly 100 is preferably in a closed position, as shown in FIG. 2. The bias exerted by the first and second biasing assemblies 140, 160 on the planar member 120 can be sufficient to place the planar member 120 in contact with the port assembly 200, including the raised portion 210, if present. Accordingly, the planar member 120 can seal the port 220, inhibiting fluid from flowing through the port. The hinge assembly 180, as described above, can sometimes comprise a biasing member to augment the function of the first and second biasing assemblies 140, 160.

Under certain circumstances, the pressure of fluid, such as air, on the planar member 120 through the port 220 can overcome the bias experienced by the planar member 120. The amount of pressure required can be adjusted by adjusting the amount of bias exerted by the biasing assemblies 140, 160 and/or hinge assembly 180. Such a pressure differential can cause the planar member 120 to rotate about the hinge assembly 180, moving to an open position as shown in FIG. 1. When in the open position, fluid can flow through the port 220, past the planar member 120.

Thus, when disposed in an aircraft, the valve assembly 100 can inhibit air from flowing into the aircraft when the interior, behind the planar member 120, is at a higher pressure than the ambient atmosphere. If the ambient atmospheric pressure were to exceed that of the interior, the valve assembly 100 can open to permit equalization between the two. Because of the bias experienced by the planar member 120, however, the pressure required to open the valve assembly 100 can be more than a mere differential. For example, the valve assembly 100 can be constructed, configured, and/or adapted to open, permitting fluid to flow through the port, when the exterior pressure is more than 3 p.s.i. greater than the internal pressure of the aircraft. In some embodiments, less pressure, such as 0.05 p.s.i. can be sufficient, while other valve assemblies can only admit air after a 10 p.s.i. difference is present between internal and ambient air pressures. The pressure differential can be specific to the embodiment, as desired.

In the event the planar member 120 should become damaged, such as by a crack extending from one edge to another, the bias exerted by various components will be localized to the individual portions of the planar member 120 to which the components are coupled. For example, if the planar member 120 were to be split into two pieces down the longitudinal axis l by a crack extending from the first minor edge 128 to the second minor edge 126, each of the halves of the planar member 120 would be biased against the port assembly 200 by the biasing assembly 140, 160 coupled to it. In those embodiments where the hinge assembly 180 also exerts a bias, it too would continue to bias the portion of the planar member 120 to which it was coupled towards the port assembly 200.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A negative pressure valve assembly comprising:
    a valve port assembly comprising a port and a flange substantially surrounding the port; and
    a valve comprising:
        a plate adapted to substantially cover the port and extending at least partially over the flange, the plate movable between a closed position, in which fluid may not flow through the port, and a plurality of open positions, in which fluid may flow through the port, the plate comprising:
            a minor edge;
            a major edge having a major edge length; and
            a plate biasing assembly stop located at a first position along the major edge, the first position more than 50% of the major edge length, as measured from the minor edge, the plate biasing assembly stop extending away from the major edge and comprising a stop plate;
        a hinge coupled to the plate along the minor edge, and rotatably coupling the plate to the flange; and
        a first plate biasing assembly rotatably coupled to the valve port assembly and contacting the plate biasing assembly stop to thereby supply a force to the plate that biases the plate towards the closed position, the first plate biasing assembly configured to exert a continuously increasing force to the plate that biases the plate to the closed position when the plate moves from the closed position to any one of the open positions.

2. The negative pressure valve assembly of claim 1, wherein the negative pressure valve assembly is disposed in an aircraft.

3. The negative pressure valve assembly of claim 1, further comprising a sealing member disposed between the plate and the flange and adapted to inhibit fluid communication through the port when the plate is in contact with the flange.

4. The negative pressure valve assembly of claim 1, further comprising a second plate biasing assembly coupled to the plate, the second plate biasing assembly adapted to couple to the valve port assembly and to bias the plate towards the valve port assembly.

5. A pressure relief valve comprising:
    a plate having a major surface area and a first edge, the plate extending along a longitudinal axis;
    a hinge coupled to the plate along the first edge, the hinge adapted to couple to a port assembly and configured such that the plate may move between a closed position, in which fluid may not flow through the port, and a plurality of open positions, in which fluid may flow through the port; and
    a first positioning spring assembly coupled to the plate at a first position, wherein at least 50% of the major surface area of the plate is disposed between the first position and the first edge, as measured along the longitudinal axis, the first positioning spring assembly supplying a force that biases the plate towards the closed position, and configured to exert a continuously increasing force to the plate that biases the plate to the closed position when the plate moves from the closed position to any one of the open positions, the first positioning spring assembly comprising:
        a compression spring having a first end;
        a coupling rod extending along the compression spring; and
        a spring stop adapted to receive the first end of the compression spring.

6. The pressure relief valve of claim 5, wherein the first positioning spring assembly is adapted to be rotatably coupled to the port assembly.

7. The pressure relief valve of claim 5, wherein the plate further comprises a first biasing assembly stop at the first position, the first biasing assembly stop extending away from the plate and adapted to couple with the first positioning spring assembly.

8. The pressure relief valve of claim 7, wherein the compression spring has a second end and the first biasing assembly stop comprises a flat portion and a hole, the coupling rod extending through the hole of the first biasing assembly stop and the flat portion adapted to receive the second end of the compression spring.

9. The pressure relief valve of claim 5, wherein the hinge is adapted to bias the plate towards the port assembly.

10. The pressure relief valve of claim 9, wherein the hinge comprises a torsional spring adapted to bias the plate towards the port assembly.

11. The pressure relief valve of claim 5, further comprising a second positioning spring assembly coupled to the plate at a second position, wherein the first position and second position are located across the longitudinal axis from each other.

12. The pressure relief valve of claim 5, wherein the plate comprises a regular geometric shape.

13. A pressure relief valve assembly comprising:
a planar member extending along a longitudinal axis and comprising:
a major surface area;
a first edge; and
a first biasing assembly stop at a first position, wherein at least 50% of the major surface area of the planar member is disposed between the first position and the first edge, as measured along the longitudinal axis, the first biasing assembly stop extending in a transverse direction to the longitudinal axis;
a hinge coupled to the planar member along the first edge, the hinge adapted to couple to a port assembly and configured such that the planar member may move between a closed position, in which fluid may not flow through the port, and a plurality of open positions, in which fluid may flow through the port; and
a first biasing assembly comprising a first resilient member, the first resilient member coupled to the first biasing assembly stop, and the first biasing assembly configured to:
couple to the port assembly; and
supply a force to the planar member that continually biases the planar member towards the closed position during rotation of the planar member about the hinge; and
exert a continuously increasing force to the planar member that biases the planar member to the closed position when the planar member moves from the closed position to any one of the open positions.

14. The pressure relief valve assembly of claim 13, wherein the hinge comprises a second resilient member adapted to bias the planar member towards the port assembly.

15. The pressure relief valve assembly of claim 13, wherein the first resilient member comprises an elastomeric member.

16. The pressure relief valve assembly of claim 13, wherein the first biasing assembly is adapted to pivot during rotation of the planar member about the hinge.

17. The pressure relief valve assembly of claim 14, wherein the planar member further comprises a second biasing assembly stop at a second position, the second position located across the longitudinal axis from the first position.

18. The pressure relief valve assembly of claim 17, further comprising a second biasing assembly comprising a third resilient member coupled to the second biasing assembly stop, the second biasing assembly adapted to couple to the port assembly and to bias the planar member towards the port assembly.

19. The pressure relief valve assembly of claim 13, further comprising a locking member adapted to couple the planar member to the port assembly.

* * * * *